United States Patent [19]
Spohn et al.

[11] Patent Number: 6,114,441
[45] Date of Patent: Sep. 5, 2000

[54] BLENDS OF GRAFTED FLUOROPOLYMER AND POLYESTER

[75] Inventors: Peter Dwight Spohn, Wilmington; Pallatheri Manackal Subramanian, Hockessin, both of Del.

[73] Assignee: E. I. du Pont de Nemours and Company, Wilmington, Del.

[21] Appl. No.: 09/235,423

[22] Filed: Jan. 22, 1999

Related U.S. Application Data

[63] Continuation-in-part of application No. 09/107,203, Jun. 29, 1998, abandoned.
[60] Provisional application No. 60/053,849, Jul. 25, 1997.
[51] Int. Cl.⁷ .................................................... C08L 67/02
[52] U.S. Cl. .............................................. 525/64; 525/68
[58] Field of Search .......................................... 525/64, 68

[56] References Cited

U.S. PATENT DOCUMENTS 5,576,106  11/1996  Kerbow et al. .................... 428/403

FOREIGN PATENT DOCUMENTS 0 761 757 A1  3/1997  European Pat. Off. ........ C08L 51/00

*Primary Examiner*—Patricia A. Short
*Attorney, Agent, or Firm*—Thomas W. Steinberg

[57] ABSTRACT

A melt-mixed blend of thermoplastic polyester and grafted fluoropolymer having polar functionality exhibits good mechanical properties and is useful in articles for transport and containment of fuels and as a component of laminates, such as fuel hose.

8 Claims, No Drawings

BLENDS OF GRAFTED FLUOROPOLYMER AND POLYESTER

RELATED APPLICATION

This application is a continuation-in-part of application No. 09/107,203 filed Jun. 29, 1998, now abandoned, which in turn claims the benefit of Provisional Application No. 60/053,849 filed Jul. 25, 1997.

FIELD OF THE INVENTION

This invention relates to blends of fluoroploymer with polyester.

BACKGROUND OF THE INVENTION

U.S. Pat. No. 5,576,106 (Kerbow et al.) discloses a process for grafting an ethylenically unsaturated compound onto the surface of the particles of fluoropolymer powder. The ethlenically unsaturated compound provides polar functionality to the fluoropolymer, which is otherwise non-polar. The utility of the resultant grafted fluoropolymer powder is disclosed to be to act as an adhesive to adhere dissimilar materials together, such as tetrafluoroethylene/ethylene (ETFE) copolymer to polyamide. To demonstrate the interaction between the grafted powder and the polyamide, a blend of grafted powder and polyamide is made by simple mixing of these components in a weight ratio of 67:33 (55:45 by volume) and the resultant blend is compression molded to yield tensile plaques which exhibit improved elongation.

European Patent Application publication EP 0 761 757 discloses a fluorine-containing polymer alloy of a grafted fluorine-containing polymer and a polymer containing no fluorine, the fluorine-containing polymer having hydrogen atoma bonded to carbon atoms of its main chain. The grafting is done by melt mixing a fluorine-containing polymer having hydrogen atoms bonded to main-chain carbon atoms, a grafting compound having a linking group and a functional group, and a radical-forming age nt (peroxide), apparently either simultaneously with or prior to mixing with the polymer containing no fluorine to form the alloy. No amount of grafting compound actually grafted to fluorine-containing polymer is disclosed, and the average particle size of the dispersed fluoropolmer is relatively large, i.e., 0.7 $\mu$m (700 nm) and larger. In attempts to evaluate this grafting technology, the maximum amount of maleic anhydride that could actually be grafted to ETFE fluoropolymer was no more than 0.2 wt %. The color of the product indicated residual decomposition products from the grafting chemistry, and no bond of such grafted fluorine-containing polymer to 6,6-polyamide was obtained in coextrusion.

There remain needs for fuel hose of simple construction, for shaped articles for handling and containing fuel fluids, and for materials for use in fabricating such hose and articles.

SUMMARY OF THE INVENTION

It has now been discovered that polar-grafted fluoropolymer can be melt blended with polyester to produce a dispersion of the fluoropolymer in a matrix of the polyester, so as to provide enhanced utility such as in composite hose which is useful for conveying fuel in motorized vehicles, or in containers for handling fuel or fuel vapors. This invention, then, provides a melt-mixed blend, comprising polyester as the matrix of the blend and fluoropolymer having polar functionality dispersed therein with average dispersed particle size of no more than 500 nm, said polar functionality being present as part of an ethylenically unsaturated compound grafted to said fluoropolymer. The melt-mixed blend has utility as a barrier to chemicals such as fuels having high vapor pressure, and thus in articles for transport and containment of such chemicals.

The melt-mixed blend is useful in structures made from the blend alone, and in composite structures with fluoropolymer and/or polyamide. In such composites, a separate adhesive layer is no longer necessary to adhere the components together.

DETAILED DESCRIPTION

The melt-mixed blend of the present invention comprises polyester resin and polar-grafted fluoropolymer resin.

Polyester resins that can be used as the polyester component of the melt-mixed blend of the invention are thermoplastic polyesters. Such polyesters are among a group of polymers having polar functionality along the polymer backbone and are described in Kirk-Othmer, Encyclopedia of Chemical Technology, 4th ed., Vol. 19, p. 609 (1996). Thermoplastic polyesters include a wide range of compositions, including poly(ethylene terephthalate), poly (butylene terephthalate), poly(cyclohexanedimethylene terephthalate), poly(cyclohexyldimethylene terephthalate), and poly(ethylene naphthalene-2,6-dicarboxylate). Also included among thermoplastic polyesters are polymers that are thermoplastic elastomers, such as poly(ester-ether) block copolymers, and liquid crystal (all-aromatic) polyesters. Thermoplastic polyesters used in the present invention have sufficiently high molecular weight to be formed into self-supporting flexible films, and preferably have a number average molecular weight of at least 10,000. Preferred thermoplastic polyesters include poly(ethylene terephthalate), poly(butylene terephthalate), and thermoplastic polyesters that are thermoplastic elastomers.

The polyester is present as the matrix of the melt-mixed blend of the present invention. That is, the polyester component forms the continuous phase of the melt-mixed blend.

With respect to the fluoropolymer constituting the fluoropolymer component of the melt-mixed blend of the present invention, a wide variety of fluoropolymers can be used which are melt extrudable, such as indicated by a melt viscosity in the range of $0.5 \times 10^3$ to $60 \times 10^3$ Pa·s as normally measured for the particular fluoropolymer. The fluoropolymer is made from at least one fluorine-containing monomer, but may incorporate monomer which contains no fluorine or other halogen. Preferably at least one monomer contains hydrogen and in that regard the hydrogen/fluorine atomic ratio is preferably at least 0.1:1. The fluoropolymer, however, preferably contains at least 35 wt % fluorine. Fluorinated monomers include those which are fluoroolefins containing 2 to 8 carbon atoms and fluorinated vinyl ether (FVE) of the formula $CY_2=CYOR$ or $CY_2=CYOR'OR$ wherein Y is H or F and —R— and —R'— are independently completely fluorinated or partially fluorinated linear or branched alkyl and alkylene groups containing 1 to 8 carbon atoms. Preferred R groups contain 1 to 4 carbon atoms and are preferably perfluorinated. Preferred R' groups contain 2 to 4 carbon atoms and are preferably perfluorinated. Hydrocarbon monomers that can be used include ethylene, propylene, n-butylene, and iso-butylene. Preferred fluoropolymers are the copolymers of ethylene with perhalogenated monomers such as tetrafluoroethylene (TFE) or chlorotrifluoroethylene (CTFE), such copolymers being often referred to as ETFE and ECTFE, respectively. In the case of ETFE, minor amounts of additional monomer are commonly used to improve properties such as reduced high temperature brittleness. Perfluoro(propyl vinyl ether) (PPVE), perfluoro(ethyl vinyl ether) (PEVE), perfluorobutyl ethylene (PFBE), and hexafluoroisobutylene (HFIB) are preferred additional comonomers. ECTFE may also have additional modifying comonomer. Other fluoropolymers that can be used include vinylidene fluoride ($VF_2$) polymers including homopolymers and copolymers with other perfluoroolefins, particularly hexafluoropropylene (HFP) and optionally TFE. TFE/HFP copolymer which contains a small amount of $VF_2$, which copolymer is often referred to as THV, can also be used. Examples of perfluorinated copolymers include TFE with HFP and/or PPVE or perfluoro(ethyl vinyl ether). Such fluoropolymers are usually partially-crystalline as indicated by a non-zero heat of fusion associated with a melting endotherm as measured by DSC on first melting, and are considered to be fluoroplastics rather than fluoroelastomers.

The fluoropolymer is functionalized by having an ethylenically unsaturated compound grafted thereto which imparts polar functionality to the fluoropolymer, the polar functionality being present as part of the ethylenically unsaturated compound. More particularly, the polar-grafted fluoropolymer used in the melt-mixed blend of the present invention preferably is in the form of, i.e., is produced as, powder having the grafting compound grafted to the surface of the powder particles. Thus, the polar-grafted fluoropolymer is, also, surface-grafted fluoropolymer powder, or surface-grafted fluoropolymer. Such surface-grafted fluoropolymer powder is disclosed, for example, in U.S. Pat. No. 5,576,106. Such surface-grafted powder has good color, i.e., is not discolored, indicating that it is free from residues of the sort that accompany extrusion grafting. Examples of polar functionality provided by grafting include acids, including carboxylic, sulfonic and phosphonic acids, and esters and salts thereof, and epoxides. Glycidyl methacrylate is an example of a grafting compound that provides epoxide functionality. Among compounds for grafting onto and thereby becoming part of the polar-grafted fluoropolymer, maleic acid and maleic anhydride are preferred. Maleic anhydride can be halogen-substituted, e.g., dichloro-maleic anhydride and difluoro-maleic anhydride. The amount of grafting compound grafted to the fluoropolymer will be in an amount that is effective to cause development, in melt mixing of the blend, of the small dispersed particle size of the polar-grafted fluoropolymer as stated below. Generally, the amount of grafted compound is in the range of 0.1 wt % to 5 wt % based on the total weight of the resultant polar-grafted fluoropolymer. Preferably, the amount of grafted polar-functional compound is 0.2–3 wt %, more preferably 0.3–2 wt %. The surface-grafted fluoropolymer is prepared prior to melt blending with the polyester.

As one skilled in the art will recognize, it is possible to carry out chemical reactions on the polar-grafted fluoropolymer to alter the grafted entity and thereby achieve different effects. Products of derivative reactions can be acids or salts thereof, alcohols, and the like. See, for example, U.S. Pat. No. 5,576,106. Polar-grafted fluoropolymers useful in melt-mixed blends of the present invention include such derivatized grafted fluoropolymers. That is, the polar functionality present as part of the ethylenically unsaturated compound grafted to the fluoropolymer can be modified by derivative chemical reaction after grafting has occurred to obtain a different polar functionality.

The polar-grafted fluoropolymer forms a dispersed phase of the melt-mixed blend of the present invention. The melt mixing causes the polar-grafted fluoropolymer to be present as small particles, generally well-dispersed (uniformly dispersed) in the polyester matrix. The particles of polar-grafted fluoropolymer are generally spherical in shape, e.g., predominantly having a ratio of major/minor dimensions of 2/1 or less. The dispersed particles of polar-grafted fluoropolymer are small, having average dimensions of no more than 500 nm, preferably no more than 350 nm.

The exceptionally small dispersed particle size of the polar-grafted fluoropolymer results in the melt-mixed blend of the invention having good mechanical properties and surprisingly low permeability to chemicals such as hydrocarbon and hydrocarbon-based fuels having high vapor pressure. These properties make the blend suitable for use as a barrier to such chemicals, for example, in articles for transport and containment of such chemicals, such as articles that are components of automotive fuel systems. Since the blend also adheres to fluoropolymer and/or to polyester, depending on blend proportions and laminating conditions, such articles can be composites having good integrity with fluoropolymer or polyester adhered to the melt-mixed blend of the invention, e.g., composite fuel line or hose.

The melt-mixed blend of the present invention is preferably prepared by melt blending the ingredients together under high shear. The ingredients can first be combined in desired proportions and blended with each other in the dry state, such as by tumbling in a drum, or can be combined by simultaneous or separate metering of the feed of one or more of the components to the melt blending device. Preferably, the melt blending is done in a twin screw extruder, such as manufactured by Werner & Pfleiderer or by Berstorff. Numerous other high shear melt blending devices, as known to those skilled in the art, can be used without departing from the spirit of the invention.

For blends of the present invention, the polar-grafted fluoropolymer used in the blend can impart fluoropolymer characteristics, previously lacking in polyester, to the blend without destroying the capability of the blend to adhere to neat polyester. Such characteristics can include a reduction in permeation by fuels (improved impermeability), better resistance to chemical attack, altered surface properties, and the like. Thus, the blends of the present invention are suitable for use in articles for containing and handling of fuels, such as hose, tubing, canisters, and the like. When the melt-mixed blend is to be used in combination with fluoropolymer, as in a laminate, the amount of polar-grafted fluoropolymer in the blend is preferably any amount that is effective to cause the blend to adhere to a fluoropolymer layer. Such amount will vary with the identity of the fluoropolymer of the fluoropolymer layer and the amount of polar functional compound grafted to the fluoropolymer component of the blend.

The melt-mixed blend of the present invention can adhere to a coextruded layer of another polymer which may be fluoropolymer or polyester. As will be recognized by one skilled in the art, such adhesion can depend on laminating conditions as well as on compositions of the layers. Such conditions can include temperature, extrusion speed, draw down ratio, draw ratio balance, interfacial pressure, cooling rate, cooling conditions (such as maintenance of pressure during cooling), and the like, and can be influenced by equipment choices such as mandrel length, die design features including land length, and the like. By "adhere to a coextruded layer of another polymer" is meant that, when a laminate comprising another polymer and melt-mixed blend layers is formed in a single extrusion step, i.e., by coextrusion, the melt-mixed blend layer and the other layer adhere to one another without the presence of an adhesive tie layer. The adhesion can be characterized, for example, when the coextrusion is in the form of tubing and the melt-mixed blend of the invention forms one of the layers. When the tubing is longitudinally cut in half, the cut composite tubing half can be flexed and even bent at a 90° angle without the melt-mixed blend layer delaminating from the other layer.

The amount of polar-grafted fluoropolymer in the blend is generally 3–43 vol %, preferably 6–29 vol %, most preferably 10–21 vol %, based on combined weight of polyester and polar-grafted fluoropolymer. For polar-grafted fluoropolymer that is a grafted copolymer of ethylene, tetrafluoroethylene, and perfluorobutyl ethylene as described in the examples below, the aforesaid concentrations in vol % correspond to 4–50 wt %, 8–35 wt %, and 13–26 wt %, respectively, calculated using 1.70 g/cm$^3$ and 1.30 g/cm$^3$ as densities of the fluoropolymer and the polyester, respectively. For functionalized perfluoropolymer, concentrations by weight corresponding to the aforesaid volume concentrations would be higher according to the higher density of perfluorinated resins, typically about 2.15 g/cm$^3$.

One skilled in the art will recognize that the polar-grafted fluoropolymer component of the melt-mixed blend of the present invention can, itself, be a blend. Thus, for example, the polar-grafted fluoropolymer component can be a blend of two or more polar-grafted fluoropolymers, or a blend of at least one polar-grafted fluoropolymer and at least one fluoropolymer that has not been grafted with a compound having polar functionality. Such blends are considered to be polar-grafted fluoropolymer for purposes of calculating concentration of grafted polar-functional compound, e.g., 0.1–5 wt %, in polar-grafted fluoropolymer, and for purposes of calculating concentration of polar-grafted fluoropolymer, e.g., 3–43 vol %, in the melt-mixed blend of the invention. I.e., such concentrations refer to total fluoropolymer, and to total fluoropolymer present in the blend.

Additionally, it has been found that polar-grafted fluoropolymer as described below can be used to adhesively activate the polyester, as well as to enhance properties of the polyester. That is, when polar-grafted fluoropolymer is incorporated into polyester to form a blend of the present invention, the resultant blend can be directly adhered to non-functional fluoropolymer by melt processes to form a laminate. Such non-functional fluoropolymer has the same general composition as the fluoropolymer that is polar-grafted, or is compatible (miscible) with the fluoropolymer that is polar-grafted. By "directly adhered" is meant that there is no intervening tie layer present. It is the adhesive activation of the polyester of the polymers forming the layers that causes the adhesion of the layers, one to the other, thereby providing integrity to the laminate without the use of a tie layer. The adhesive activation suggests utility of the blends, for example, in tubular laminates with fluoropolymer for use as fuel hose. See Example 11 below.

EXAMPLES

The polar-grafted fluoropolymer of the examples below is prepared generally according to Example 1 of U.S. Pat. No. 5,576,106. The fluoropolymer resin is an ETFE copolymer modified with PFBE, having an E/TFE molar ratio of about 0.9, containing 1 mol % PFBE, and having a melt flow rate (MFR) of about 7 g/10 min as measured according to ASTM D-3159 at 297° C. The copolymer is used as a finely divided powder having average particle size of about 100–120 μm (within the preferred range of 50–500 μm), as described in the '106 patent. Copolymer powder and maleic anhydride are blended in a powder/anhydride ratio of 100/1 and subjected to 6 Mrad of electron irradiation in a closed container to obtain surface-grafted powder. The resultant concentration of grafted maleic anhydride is about 0.4 wt %, as determined by the method disclosed in U.S. Pat. No. 5,576,106. The grafted ETFE powder is compacted at ambient temperature into pellets to facilitate feeding to an extruder. This polar-grafted fluoropolymer is identified as "g-ETFE".

Unless otherwise specified, the polyester used is a poly (ethylene terephthalate) resin, (Crystar® polyester terephthalate resin grade 5054, DuPont), hereinafter "PET".

Proportions of g-ETFE and polyester in the following are based on combined weight or on combined volume of g-ETFE and polyester.

Unless otherwise noted, MFR is measured at 297° C. according to ASTM D-3159 for blends of g-ETFE and polyester.

Tensile properties are also measured according to ASTM D-3159.

Example 1

Blend 1 is 20 wt % (16.0 vol %) g-ETFE. The melt blending device is a 40-mm Werner & Pfleiderer twin screw extruder equipped with high-shear two-zone mixing screws operating at 400 rpm. The g-ETFE (40 lb/hr, 18.2 kg/hr) and PET (160 lb/hr, 72.7 kg/hr) are fed into barrel section1 by separate K-Tron loss-in-weight screw feeders. A vacuum is applied at barrel section 8. External barrel temperatures are 260°–285° C. After exiting through a 4-hole die, the strands are quenched in an ambient temperature water trough with circulating water. The strands are subsequently pelletized and allowed to cool under nitrogen sparge. A film is hot-pressed from the Blend 1 pellets, and transmission electron micrographs (TEM) are recorded. The blend shows good mixing, with predominantly spherical g-ETFE particles having average diameter of less than 500 nm well dispersed in the PET.

Example 2

Blend 2 is 50 wt % (43.3 vol %) g-ETFE. Blend 2 is prepared essentially by the procedure of Example 1, except that the feed rates of the g-ETFE and the PET are each 100 lb/hr (45.5 kg/hr). TEM for a film sample shows good mixing, with predominantly spherical g-ETFE particles having average diameter of less than 500 nm well dispersed in the PET.

Example 3

The procedure of Example 1 is essentially repeated, except that the PET is replaced with a thermoplastic elastomer (TPE, Hytrel® polyester elastomer grade 8238, DuPont) at the same feed rate to obtain Blend 3 that is 15.8 vol % g-ETFE, calculated using 1.28 g/cm$^3$ as the density for TPE. TEM for a film sample shows good mixing, with predominantly spherical g-ETFE particles having average diameter of less than 500 nm well dispersed in the thermoplastic polyester elastomer.

Example 4

Blend 3 (prepared as in Example 9) and TPE are coextruded as a two-layer composite tubing having the melt-mixed blend as the inner layer, and the TPE as the outer layer. The melt-mixed blend is extruded using a 1.0-inch (2.5-cm) Entwhistle extruder equipped with a general purpose screw and at a melt temperature of 444° F. (229° C.) entering the coextrusion crosshead to form the inner layer of the coextruded tubing. The polyester is extruded using a 1.5-inch (3.81 cm) Davis-Standard extruder equipped with a mixing screw and at a melt temperature of 418° F. (214° C.) entering the coextrusion crosshead to form the outer layer of coextruded tubing. The crosshead die temperature is 600° F. (316° C.) and the extrusion rate is 10 ft/min (305 cm/min). The coextruded tubing is 0.270 inch (6.86 mm) in outer diameter and has a wall thickness of 0.030 inch (0.76 mm) of which the melt-mixed blend inner layer is 0.003 inch (0.08 mm) thick. Adhesion between the inner and outer layers of the coextruded tubing is demonstrated by cutting lengths of the tubing longitudinally in half and flexing and bending a resultant half of the tubing. The layers do not separate, demonstrating the adhesion of the melt-mixed blend of the invention to polyester. Such composite tubing can be used for fuel transport tubing.

Example 5

Blend 1 (Example 1) is also prepared in a laboratory twin-rotor mixer with roller type rotors (Prep Mixer, C. W. Brabender Instrument Corp.) controlled and driven by Brabender's Plasti-Corder® microprocessor controlled torque rheometer. TEM for a film sample shows good mixing, with predominantly spherical g-ETFE particles having average diameter of about 400 nm well dispersed in the PET. Tensile strength is 6301 psi (43.4 MPa) and elongation is 200%. When the experiment is repeated using a similar ETFE resin that has not been grafted, dispersed ETFE spherical particles are much larger, of the order of 2000–2500 nm in average diameter, tensile strength is 5648 psi (38.9 MPa), and elongation is only 6%.

Example 6

Blend 1 is also prepared by melt mixing with one pass through a 25-mm Brabender parallel twin screw extruder operating at 180 rpm and at an external barrel temperature of 330° C. TEM for a film sample shows good mixing, with predominantly spherical g-ETFE particles having average diameter of about 275 nm well dispersed in the PET. Tensile strength is 7516 psi (51.8 MPa) and elongation is 282%. The improved tensile properties and smaller dispersed particle size relative to Example 5 reflect better mixing in the twin screw extruder.

Example 7

Blend 2 (Example 2) is also prepared with one pass through the Brabender twin screw extruder. Tensile strength is 6613 psi (45.6 MPa) and elongation is 78%.

Example 8

Blend 4 is similar to Blend 2 prepared as in Example 7, except that half of the g-ETFE is replaced with a similar ETFE resin that has not been grafted. TEM for a film sample shows good mixing, with predominantly spherical g-ETFE particles having average diameter of about 450 nm well dispersed in the PET. Tensile strength is 5697 psi (39.3 MPa) and elongation is 173%.

Example 9

Blend 3 (Example 4) is also prepared by melt-mixing the g-ETFE and the TPE with two passes through the Brabender twin screw extruder operating at 180 rpm and at an external barrel temperature of 330° C. TEM for a film sample shows good mixing, with predominantly spherical g-ETFE particles having average diameter of about 450 nm well dispersed in the TPE. Tensile strength is 4557 psi (31.4 MPa) and elongation is 45%. When the experiment is repeated using a similar ETFE resin that has not been grafted, dispersed ETFE spherical particles are much larger, of the order of 3000 nm in average diameter, tensile strength is 2736 psi (18.9 MPa), and elongation is only 8%. For the latter blend, TEM indicates that there is no interaction between the ETFE particles and the TPE matrix, with the ETFE particles separating from and in some instances falling out of the matrix. This is in contrast to Blend 3, for which TEM shows no separation of g-ETFE from the matrix, and is consistent with the strength and elongation differences.

Example 10

Sheets approximately 6 inch (15 cm) square and 0.030 inch (0.76 mm) thick are molded from Blend 1 prepared as in Example 6, and from an ETFE resin that is not functionalized by polar grafting (Tefzel® ETFE fluoropolymer resin grade 200), by hot pressing. The sheets are placed together within the 6-inch square opening in a 0.050-inch (1.3-mm) thick chase and between two metal plates. This sandwich is placed in a laboratory press having heated platens at 300° C., and the sandwich is heated for 5 min without applied pressure. The pressure on the sandwich is increased to 56 psi (0.39 Mpa) for 5 min. Then, the pressure is released, the platens are allowed to cool, and the sample is examined. The two sheets are in intimate contact and cannot be separated with fingernails or even with a knife. By visual examination of the interface, it appears that Blend 1 and the fluoropolymer have merged (blended) at the interface. When a sheet of PET is substituted for the Blend 1 sheet and the laminating procedure is repeated, there is no interaction between the polyester and the ETFE, i.e., no adhesive bond is formed. The adhesive bond between Blend 1 and the ETFE indicates the adhesive activation of the polyester by the g-ETFE.

Example 11

The procedure of Example 10 is essentially repeated, except that Blend 3 prepared as in Example 9 is used instead of Blend 1. The two sheets are in intimate contact and cannot be separated with fingernails or even with a knife. By visual examination of the interface, it appears that Blend 3 and the fluoropolymer have merged (blended) at the interface. When a sheet of TPE is substituted for the Blend 3 sheet and the laminating procedure is repeated, there is no interaction between the polyester and the ETFE, i.e., no adhesive bond is formed.

This bonding is also accomplished by coextrusion using the following process. Blend 3 and ETFE 200 are coextruded as a two layer composite having the fluoropolymer as the inner layer and Blend 3 as the outer layer. The ETFE resin is extruded using a 1.0 inch (2.54 cm) Davis extruder equipped with a mixing screw and at a melt temperature of 575° F. (302° C.). The melt-mixed blend is extruded using a 1.5-inch (38-mm) Davis extruder equipped with a general purpose screw at a melt temperature of 500° F. (260° C.). The die has a land length of 3.5 inch (8.9 cm) and the extrusion is carried out in a pressure extrusion mode at the rate of 10 ft/min (3.05 m/min). The crosshead die temperature is 530° F. (288° C.). The coextruded tubing is 0.270 inch (6.9 mm) in outside diameter and has a wall thickness of 0.030 inch (0.76 mm) of which the ETFE resin inner layer is 0.005 inch (0.13 mm) thick. Adhesion between the layers is demonstrated by cutting lengths of the tubing longitudinally in half, and flexing and bending a resultant half of the tubing. The layers do not separate, demonstrating the adhesion of the melt-mixed blend of the invention to the fluoropolymer. Such composite tubing exhibits excellent impermeability to fuel (and fuel vapor) and can be used for fuel transport tubing.

TPE can also be coextruded along with the above components in a multi-layer system having the melt-mixed blend as the middle layer, using the TPE extrusion conditions described in Example 4.

Example 12 and Control A

Ethanolamine (3 g) is dissolved in acetone (200 mL). Then, 200 g of g-ETFE are added and the mixture is swirled at room temperature for 5 min using a magnetic stirrer. The mixture becomes light yellow. The acetone is evaporated, the resin is baked in a circulating air oven for 24 hr at 50° C., then for 24 hr at 100° C., and then the resin is cooled and stored in a plastic bag. A sample of the g-ETFE-OH is dry-blended with a glass reinforced polyester resin (GR-PET, Rynite® PET thermoplastic polyester resin grade RE5220 NC010, DuPont) in the proportions 20% g-ETFE-OH and 80% GR-PET by weight. The g-ETFE-OH/GR-PET blend is then melt-mixed by one pass through a 25-mm Brabender parallel twin screw extruder, operating at 130 rpm and at an external barrel temperature of 300° C., and equipped with a single-strand die. The extrudate is drawn through a water trough and cut into pellets. The GR-PET without g-ETFE is also extruded and converted into pellets in the same manner (Control A). Pellets are dried for at least 2 hr at 190° F. (88° C.) before compression molding into plaques 0.125 inch (3.2 mm) thick using a laboratory press at 300° C. Dielectric strength (ASTM D-149), and dielectric constant and dissipation factor at 1 MHz (ASTM D-150) at 23° C. are given in Table 1. Dielectric strength is improved by about 30% for the melt-mixed blend of the invention containing polar-grafted fluoropolymer.

TABLE 1

Blend Properties for Example 12

| Property | 12 | A |
| --- | --- | --- |
| Dielectric strength (kV/mm) | 17.5 | 13.5 |
| Dielectric constant | 3.60 | 3.85 |
| Dissipation factor | 0.012 | 0.014 |

What is claimed is:

1. A melt-mixed blend, comprising thermoplastic polyester as the matrix of the blend and fluoropolymer having polar functionality dispersed therein, said dispersed fluoropolymer having average particle size of no more than 500 nm, said polar functionality being present as part of an ethylenically unsaturated compound grafted to said fluoropolymer.

2. The melt-mixed blend of claim 1, wherein said fluoropolymer is from 3 vol % to 43 vol % of said blend, based on combined volumes of said fluoropolymer and said polyester.

3. The melt-mixed blend of claim 1, wherein said compound is acid, ester, anhydride, or epoxide.

4. The melt-mixed blend of claim 1, wherein said compound is from 0.1 wt % to 5 wt % of the combined weight of said fluoropolymer and said compound.

5. The melt-mixed blend of claim 1, wherein said fluoropolymer is hydrogen containing.

6. The melt-mixed blend of claim 1, wherein said fluoropolymer is perfluorinated.

7. The melt-mixed blend of claim 1, wherein said thermoplastic polyester is thermoplastic elastomer.

8. The melt-mixed blend of claim 1, wherein said polar functionality present as part of said ethylenically unsaturated compound grafted to said fluoropolymer is modified by derivative chemical reaction after grafting has occurred.

* * * * *